(12) United States Patent
Thomasset et al.

(10) Patent No.: US 7,959,996 B2
(45) Date of Patent: *Jun. 14, 2011

(54) MULTILAYER DOSE

(75) Inventors: Jacques Thomasset, Vouvry (CH); Hugues-Vincent Roy, Vouvry (CH)

(73) Assignee: Aisapack Holding S.A., Vouvry (CH)

( * ) Notice: Subject to any disclaimer, the term of this patent is extended or adjusted under 35 U.S.C. 154(b) by 747 days.

This patent is subject to a terminal disclaimer.

(21) Appl. No.: 10/591,117

(22) PCT Filed: Feb. 26, 2005

(86) PCT No.: PCT/IB2005/050705
§ 371 (c)(1),
(2), (4) Date: Aug. 30, 2006

(87) PCT Pub. No.: WO2005/087473
PCT Pub. Date: Sep. 22, 2005

(65) Prior Publication Data
US 2007/0184237 A1     Aug. 9, 2007

(30) Foreign Application Priority Data

Mar. 1, 2004  (CH) ..................................... 0336/04
Oct. 4, 2004  (CH) ..................................... 1619/04
Dec. 8, 2004  (CH) ..................................... 2033/04
Dec. 8, 2004  (CH) ..................................... 2034/04

(51) Int. Cl.
*B32B 1/00*  (2006.01)
*B32B 1/08*  (2006.01)
*B29D 22/00*  (2006.01)

(52) U.S. Cl. ..................... 428/35.7; 428/36.9; 264/241
(58) Field of Classification Search .................. 428/35.7, 428/36.6, 36.7, 76, 161; 264/257, 266, 143, 264/148, 172.15, 173.16, 167, 241, 328.8; 425/130, 133.1, 308
See application file for complete search history.

(56) References Cited

U.S. PATENT DOCUMENTS 3,901,638 A * 8/1975 Yoshikawa et al. ........ 425/326.1
3,969,563 A   7/1976 Hollis, Sr.
4,154,893 A   5/1979 Goldman
4,390,487 A * 6/1983 O'Mara ....................... 264/107
4,876,052 A  10/1989 Yamada et al.
(Continued)

FOREIGN PATENT DOCUMENTS
DE       198 14 314 A1   10/1999
(Continued)

OTHER PUBLICATIONS

Certified Translation of JP A 02098415, Kawaguchi et al. Apr. 1990.*
(Continued)

*Primary Examiner* — Rena L Dye
*Assistant Examiner* — Erik Kashnikow
(74) *Attorney, Agent, or Firm* — Nixon & Vanderhye P.C.

(57) ABSTRACT

A multilayer dose having an axis of symmetry for the realization of multilayer objects by compression molding, including a first synthetic resin and a fine functional layer imprisoned in the first resin, the fine functional layer representing less than 20% of the volume of the dose, and wherein the fine functional layer forms the shell of a body of revolution about the axis of symmetry and the distance from the layer to the axis of symmetry is variable.

8 Claims, 15 Drawing Sheets

U.S. PATENT DOCUMENTS

| | | | | |
|---|---|---|---|---|
| 4,883,630 A | * | 11/1989 | Langecker | 264/513 |
| 4,921,647 A | | 5/1990 | Stewart | |
| 4,940,557 A | * | 7/1990 | Kimura | 264/472 |
| 5,296,278 A | | 3/1994 | Nishimura et al. | |
| 5,403,529 A | * | 4/1995 | Kawaguchi | 264/167 |
| 5,975,871 A | | 11/1999 | Kudert et al. | |
| 6,332,767 B1 | | 12/2001 | Kudert et al. | |
| 6,467,643 B1 | | 10/2002 | Sadr | |
| 6,613,408 B1 | | 9/2003 | Short | |
| 6,808,673 B2 | | 10/2004 | Van Schaftingen | |
| 2002/0182351 A1 | * | 12/2002 | Akiyama et al. | 428/35.7 |
| 2003/0080461 A1 | | 5/2003 | Kirjavainen | |

FOREIGN PATENT DOCUMENTS

| | | | |
|---|---|---|---|
| EP | 1 208 955 A | | 5/2002 |
| FR | 2 180 831 A | | 11/1973 |
| FR | 2 520 288 A | | 7/1983 |
| JP | 60-258425 | | 12/1875 |
| JP | 2-98415 | | 4/1990 |
| JP | 02098415 | | 4/1990 |
| JP | 2001-163321 | * | 6/2001 |

OTHER PUBLICATIONS

Machine translation of JP 2001-163321 Jun. 2001.*
Office Action mailed Oct. 31, 2008 in U.S. Appl. No. 10/590,201.
Office Action mailed Jun. 8, 2009 in U.S. Appl. No. 10/590,201.
Advisory Action mailed Oct. 28, 2009 in U.S. Appl. No. 10/590,201.
Office Action mailed Jun. 11, 2008 in U.S. Appl. No. 10/591,117.
Office Action mailed Dec. 24, 2008 in U.S. Appl. No. 10/591,117.
Interview Summary mailed May 6, 2009 in U.S. Appl. No. 10/591,117.
Office Action mailed Aug. 18, 2009 in U.S. Appl. No. 10/591,117.
Interview Summary mailed Oct. 28, 2009 in U.S. Appl. No. 10/591,117.
Office Action mailed Jun. 12, 2008 in U.S. Appl. No. 10/591,116.
Notice of Allowance mailed Jan. 28, 2009 in U.S. Appl. No. 10/591,116.
Office Action mailed Jun. 12, 2008 in U.S. Appl. No. 10/591,126.
Office Action mailed Dec. 24, 2008 in U.S. Appl. No. 10/591,126.
Advisory Action mailed Apr. 6, 2009 in U.S. Appl. No. 10/591,126.
Office Action mailed Jul. 2, 2009 in U.S. Appl. No. 10/591,126.
Interview Summary mailed Oct. 28, 2009 in U.S. Appl. No. 10/591,126.
Office Action mailed Jun. 11, 2008 in U.S. Appl. No. 10/591,127.
Office Action mailed Dec. 17, 2008 in U.S. Appl. No. 10/591,127.
Advisory Action mailed Jul. 6, 2009 in U.S. Appl. No. 10/591,127.
Patent Abstracts of Japan vol. 014, No. 305, Jun. 29, 1990 & JP 02 098415, Apr. 10, 1990.
Patent Abstracts of Japan vol. 010, No. 134, May 17, 1986 & JP 60 259425, Dec. 21, 1985.
International Search Report, Sep. 2005.
English Translation of International Preliminary Report on Patentability, Dec. 2006.
Office Action mailed May 18, 2010 in U.S. Appl. No. 10/590,201.
Notice of Allowance Sep. 23, 2010 in U.S. Appl. No. 10/590,201.
Office Action mailed Oct. 4, 2010 in U.S. Appl. No. 10/591,117.
Advisory Action mailed Aug. 19, 2010 in U.S. Appl. No. 10/591,126.
Office Action mailed Sep. 1, 2010 in U.S. Appl. No. 10/591,127.

* cited by examiner

Figure 1 (Prior art : US 4 876 052)
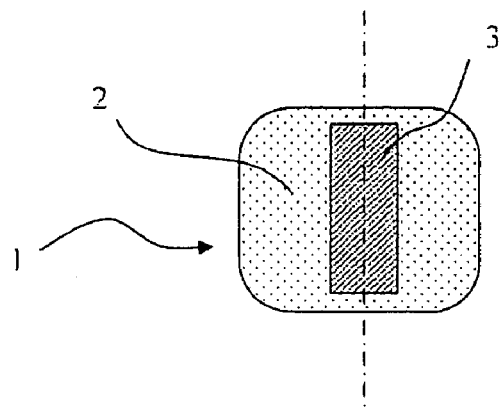
Figure 2 ( Prior art : JP 2098415)
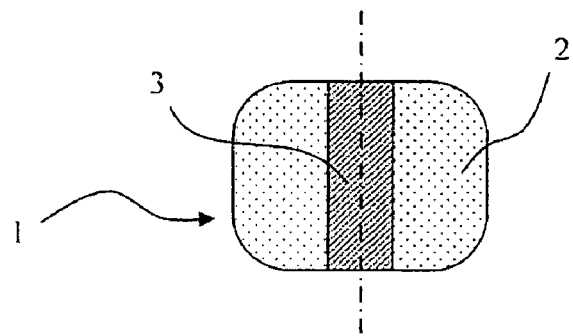
Figure 3 ( Prior art : JP 2098415)
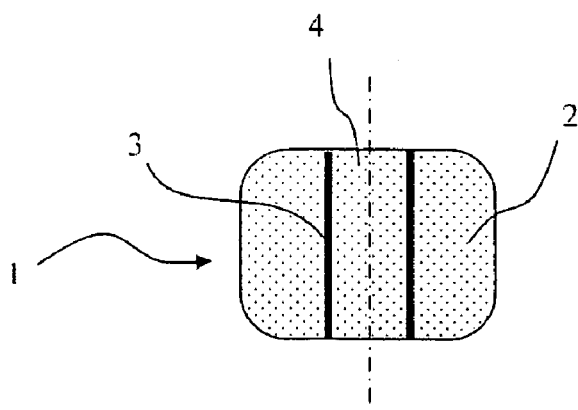

Figure 4 (Prior art: CH01619/04)
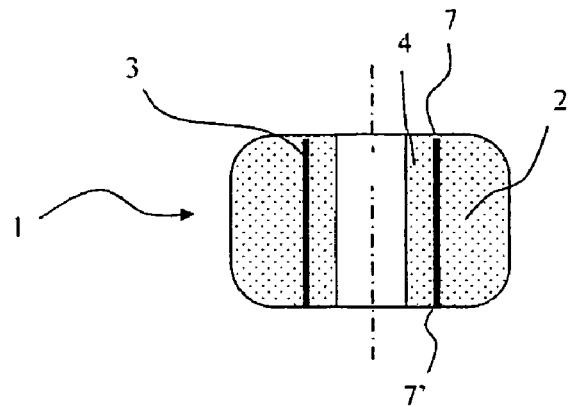
Figure 5
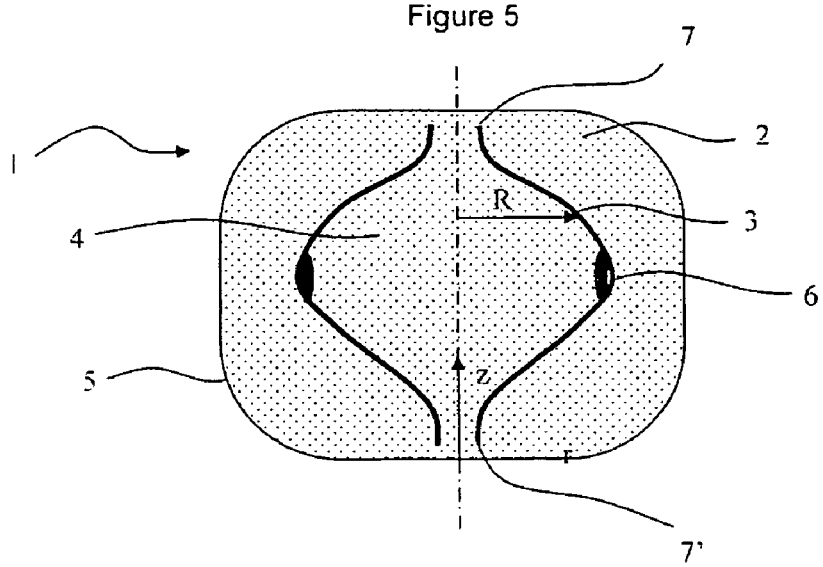
Figure 6
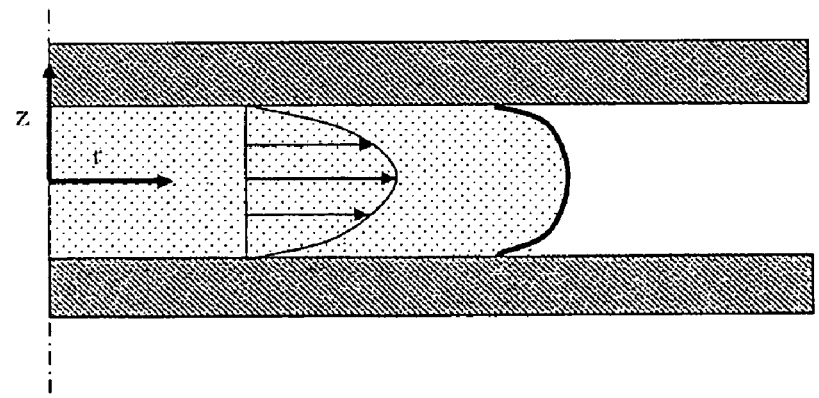

zoom

Figure 25a
Figure 25b
Figure 25c
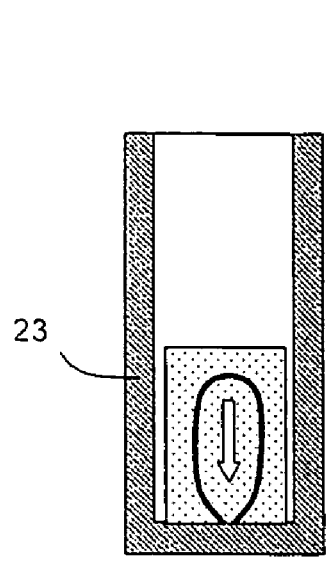
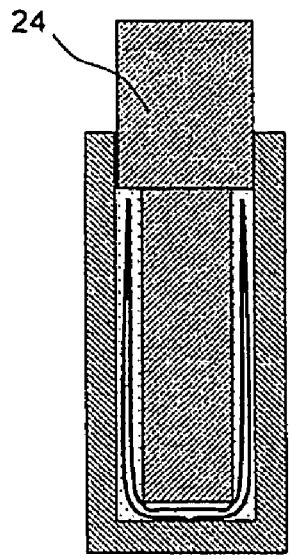
Figure 26
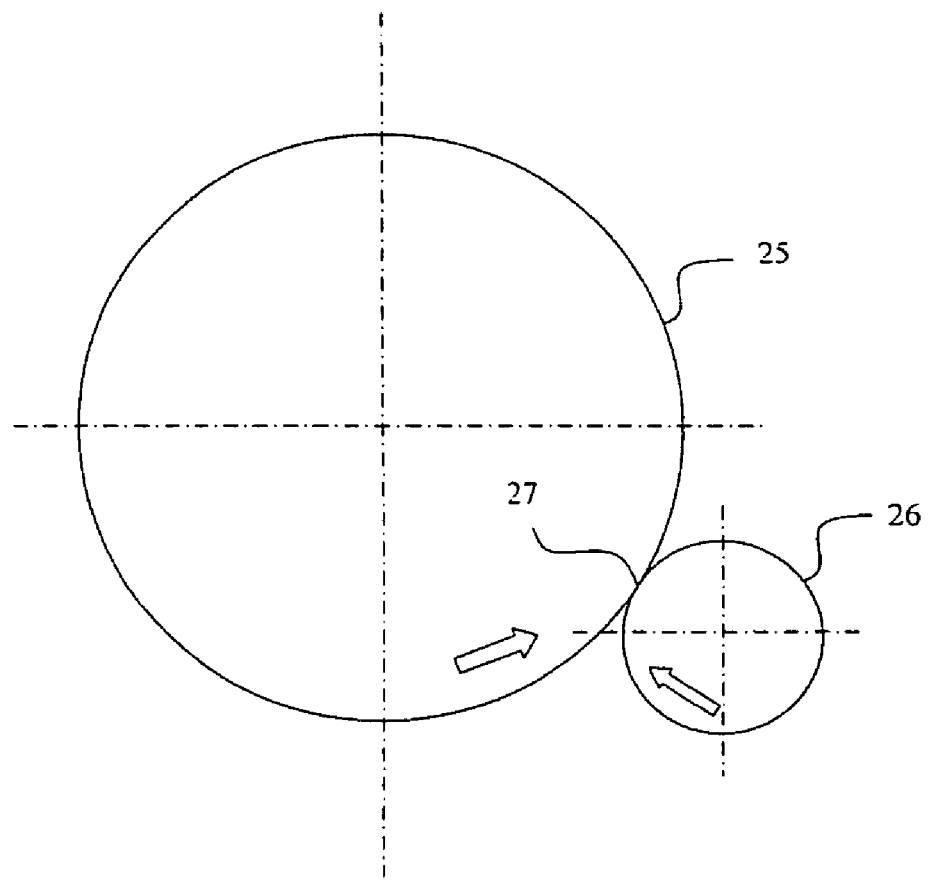

MULTILAYER DOSE

This application is the U.S. national phase of international application PCT/IB2005/050705 filed 26 Feb. 2005 which designated the U.S. and claims benefit of CH 00336/04; CH 01619/04; CH 02034/04; CH 02033/04, dated 1 Mar. 2004; 4 Oct. 2004; 8 Dec. 2004; 8 Dec. 2004, respectively, the entire content of which is hereby incorporated by reference.

FIELD OF THE INVENTION

The present invention relates to a method for realizing multilayer objects by compression molding of a multilayer dose.

PRIOR ART

U.S. Pat. No. 4,876,052 describes a multilayer dose (FIG. 1) characterized in that a functional resin 3 is fully imprisoned inside a synthetic resin 2. The functional resin and the outer resin are different in nature. For example, the functional resin has good gas-barrier properties, whereas the resin forming the outer layer is chosen for its mechanical and hygienic properties. These multilayer doses allow multilayer objects to be obtained by compression molding of said dose. However, the objects obtained according to the method described in U.S. Pat. No. 4,876,052 require a large proportion of functional resin in the object, thereby engendering two major drawbacks: the first being a prohibitive cost and the second a lowered resistance to mechanical stresses. The lack of adhesion between the functional resin and the outer resin reduces the solidity of the object and creates a risk of decohesion of the outer layer. Another drawback of U.S. Pat. No. 4,876,052 lies in the fact that the respective quantity of the resins 2 and 3 is only poorly adjustable. As will be shown further below in the account of the invention, these quantities are fixed by the geometry of the object and by the flows during the compression of the dose.

Japanese patent JP 2098415 proposes the realization of a multilayer object by compression molding starting from a composite dose (FIG. 2) characterized in that the synthetic resin 2 covers only the side faces of the functional resin 3. The compression molding of this dose along its axis of symmetry produces an object having a multilayer structure characterized in that the synthetic resin 2 partially imprisons the functional resin 3. However, the multilayer objects realized from two resins according to patent JP 2098415 have two major drawbacks: the first being that of having the functional resin 3 exposed on a central surface area of the object over at least 10% of the total surface area of the object, and the second being that of requiring a quantity of functional resin 3 in the object amounting to at least 30% of the total quantity of resin. This produces, on the one hand, objects having a prohibitive cost and, on the other hand, objects having heavily modified mechanical properties, mainly in the center of the object. Another drawback of patent JP 2098415 lies in the fact that the respective quantity of the resins 2 and 3 is only poorly adjustable, these quantities being fixed by the geometry of the object and by the flows during the compression of the dose.

In patent JP 2098415, it is proposed to use a dose containing 3 layers in order partially to eliminate the aforesaid drawbacks (FIG. 3). This dose is constituted by a first resin 4 forming the central part of the dose, by a functional resin 3 covering only the side faces of the first resin, and by a third resin 2 covering only the side faces of the functional resin. The crushing of this composite dose along its axis of symmetry produces a multilayer object. The use of a triple-layer dose has the advantage of reducing the quantity of functional resin 3 used and produces objects having slightly modified mechanical properties in relation to the same object containing a single resin 2. This method allows an adhesive layer to be added between the resins of different nature, thereby improving the cohesion and solidity of the object. However, the functional resin 3 does not cover the central part of the multilayer object, which produces objects without barrier property close to the axis of symmetry over a surface area of at least 10% of the surface area of the object. This central region of the object not covered by the barrier resin layer 3 weakens the barrier performance of the object and renders this solution less effective.

Patent application CH01619/04 describes multilayer objects realized from a compression-molded multilayer dose (FIG. 4). The objects described in this patent application have a multilayer structure characterized by the position of the functional layer forming a zigzag-shaped double fold. The functional layer is distributed correctly throughout the object, even in the central part. The method for realizing multilayer objects which is described in patent application CH01619/04 also allows control of the thickness of the functional layer. An adhesive layer can be added between the resin forming the surface of the object and the functional resin. However, the compression of the dose calls for a method and a specific molding device. This method calls especially for additional die tool movements relative to the basic compression process, setting the two parts of the mold in relative motion. In the case of high-speed molding, it can be detrimental to use a compression device as described in patent application CH01619/04.

SUBJECT OF THE INVENTION

The present invention allows multilayer objects to be realized by compression molding, by eliminating the aforesaid problems. More particularly, this method allows the use of a compression device unchanged from the device used to realize single-layer objects.

SUMMARY OF THE INVENTION

The invention consists of a multilayer dose having an axis of symmetry for the realization of multilayer objects by compression molding, constituted by a first synthetic resin and by a fine functional layer imprisoned in said first resin, said functional layer representing less than 20% of the volume of the dose, the multilayer dose being characterized in that the functional layer forms the shell of a body of revolution about the axis of symmetry and in that the distance from the layer to the axis of symmetry is variable.

DETAILED DESCRIPTION OF THE INVENTION

A better understanding of the invention will be gained below from a detailed description of the examples illustrated by the following figures.

BRIEF DESCRIPTION OF THE FIGURES

FIGS. 1 to 4 describe the multilayer doses described in the prior art for realizing multilayer objects by compression molding.

FIG. 1 shows a double-layer dose realized according to U.S. Pat. No. 4,876,052.

FIG. 2 shows a double-layer dose used in patent JP 2098415.

FIG. 3 illustrates a dose containing 3 layers, described in patent JP 2098415.

FIG. 4 shows an annular multilayer dose described in patent application CH01619/04.

FIG. 5 shows a multilayer dose according to the general concept of the invention.

FIG. 6 illustrates the material flows and the velocity profile during the compression of the dose.

FIGS. 9 to 20 present examples of multilayer doses, their realization methods and an example of a device which may be used.

FIG. 9 illustrates a first example of a dose corresponding to the invention.

FIG. 10 shows the multilayer object obtained following compression of the dose described in FIG. 9.

FIG. 11 shows a dose realized in accordance with the invention and comprising 5 layers.

FIG. 13 presents a multilayer object obtained from the compression of the dose presented in FIG. 12a.

FIG. 14 is another example of a dose belonging to the invention.

FIGS. 15 to 19 describe methods by which doses such as described in FIGS. 9, 11, 12 and 14 can be realized.

FIG. 15 illustrates a first method for realizing doses, according to which the flow rate of one of the layers varies periodically.

FIG. 16 shows a second method for realizing doses, according to which the flow rate of two layers varies periodically and in phase opposition.

FIG. 17 illustrates a multilayer rod which is used to realize multilayer doses and which can be realized with the realization method described in FIG. 16.

FIG. 18 illustrates a third method for realizing multilayer doses, according to which the flow rate of all the layers varies periodically and with a slightly fluctuating overall flow rate.

FIG. 19 shows another method for realizing multilayer doses, according to which the flow rate of each layer varies periodically and according to which the overall flow rate is periodically zero.

FIG. 20 illustrates a device by which multilayer doses according to the invention can be realized.

FIGS. 21 to 27 illustrate another example of multilayer doses, a realization method, as well as a device.

FIG. 21 shows another type of multilayer dose corresponding to the invention.

FIG. 22 shows the multilayer object obtained from the compression of the dose described in FIG. 21.

FIGS. 25a to 25c illustrate the compression of the dose in the compression device.

FIG. 26 shows the general concept of a device which may be used to realize multilayer doses.

FIG. 27 shows a device for realizing the doses represented in FIG. 21.

DETAILED DESCRIPTION OF THE FIGURES

The invention consists in realizing multilayer doses according to the concept represented in FIG. 5. This dose is constituted by a first synthetic resin forming the dose and by at least one second resin imprisoned in the first resin and forming a fine layer whose distance to the axis of symmetry R and whose thickness E varies according to the position on the axis of symmetry z. This type of dose allows the position of the barrier resin layer in the molded object, as well as the thickness of this layer, to be optimized conjointly.

In order to gain a better understanding of the dose previously described, it is necessary to consider the flow of the resins during the compression of the dose (FIG. 6). This flow is mainly dependent on the rheological properties of the resins during the compression, as well on the geometry of the object. FIG. 6 shows that this flow is faster midway between the walls than close to the walls of the die tool. Proximate to the walls of the die tool, the displacement velocity of the particles tends toward zero, but the shear deformation is high. Conversely, midway between the walls, the velocity of the particles is at a maximum and the shear deformation is at a minimum. During the flow, the functional resin layer is entrained and deformed in a non-uniform manner according to its position in the flow profile. The final position of the functional resin layer in the object is thus determined by the original position of the functional layer in the dose and by the sum of the deformations suffered during the flow.

Figure 7A:
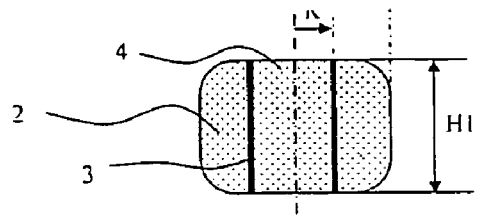
FIG. 7a to 7c illustrate the compression of a dose such as described in patent JP 2098415, as well as the multilayer object obtained.
Figure 7B:
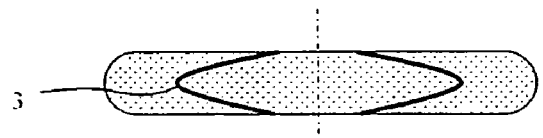
Figure 7C:
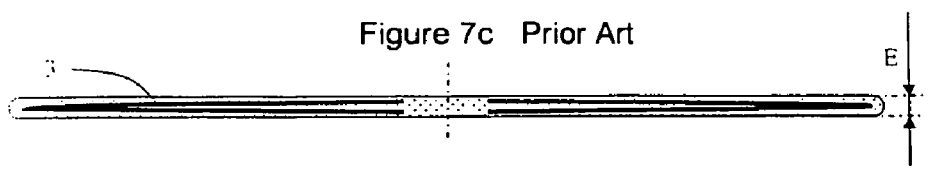

FIGS. 7a to 7c illustrate the compression of a dose such as proposed in patent JP 2098415 in order to demonstrate the limits of the multilayer objects obtained according to this method and better understand the subject of the present invention. FIG. 7a shows a triple-layer dose realized according to patent JP 2098415. This dose contains a first resin 4 forming the central part of the dose, a functional resin 3 covering only the side faces of the first resin, and a third resin 2 covering only the side faces of the functional resin. This dose has a height referred to as H1, an outer radius R1, and a radial position of the functional layer R. The compression of this dose gives rise to an intermediate step illustrated in FIG. 7b. FIG. 7b shows the deformation of the functional layer in the partially compressed dose. It is important to note that this layer becomes deformed toward the periphery of the object, that is to say in the direction of the flows, which implies that the central part of the object cannot be covered by the functional layer. It is interesting also to note that, in the intermediate step, the functional layer is still remote from the material front, which indicates that the object obtained in the intermediate step has no barrier properties at the level of the periphery. FIG. 7c illustrates the object obtained following compression of the dose. The functional layer 3 has spread out to the end of the object, while remaining encapsulated at the level of the periphery of the object. As is shown by FIG. 7c, the functional layer has not spread into the central part of the object. The object obtained according to this method therefore has the drawback of having no barrier properties in its center.

Objects such as represented in FIG. 7c have been realized from doses such as illustrated in FIG. 7a.

Figure 8:
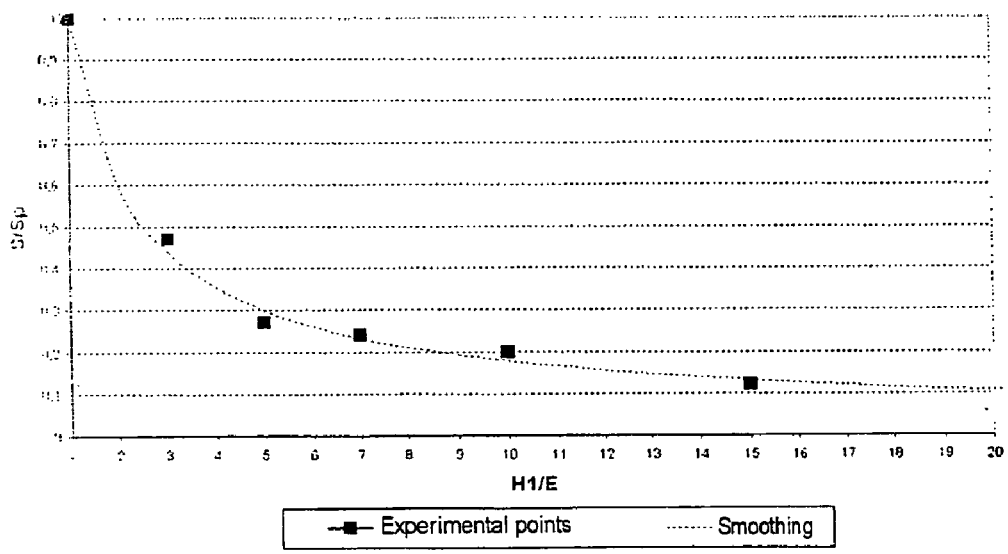
FIG. 8 shows the limits of the multilayer objects obtained according to patent JP 2098415.

The experimental findings have been plotted in FIG. 8. The surface area of the object is labeled Sp, the central surface area of the multilayer object not covered by the functional layer is labeled S, the thickness of the object is labeled E, the thickness of the dose is labeled H1. The ratio H1/E represents the compression rate. FIG. 8 shows how the fraction of surface area not covered by the functional layer S/Sp varies as a function of the compression rate H/H1. The ratio S/Sp is greater than 10%, even for compression rates of 20. This finding indicates that the functional layer covers, in the best case scenario, 90% of the surface area of the object. Measurement of the barrier properties on an object having 90% of its surface area covered by the functional material shows that this object is at least 10 times more gas-permeable than the same object realized according to the invention and having 100% of its surface area covered by the functional layer. These findings were obtained using a functional resin 100 times less permeable than the base resin.

Figure 9:
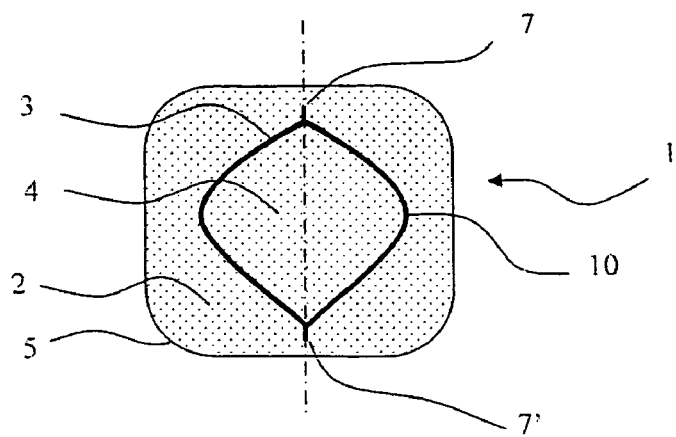

FIG. 9 shows a first example of a multilayer dose corresponding to the invention. This dose comprises a first resin layer 4 encapsulated in a functional resin layer 3, said functional resin layer 3 itself being encapsulated in a resin layer 2 forming the outer surface 5 of the dose 1. The ends 7 and 7' of the functional layer each come together at 1 point, such that the layer 4 is totally imprisoned in the functional layer 3. The position of the functional layer in the dose allows 100% of the surface area of the object, that is to say the periphery and the center, to be covered following compression. This produces a position of the functional layer in the dose according to a profile as illustrated in FIG. 9, forming a sort of closed pocket at the two ends 7 and 7' and forming a belly 10 situated approximately halfway up the dose. The radial position of the belly is not arbitrary, it is fixed by the geometry of the object and that of the dose. The exact radial position of the belly 10 allows the layer to be spread out to the periphery of the object and serves to ensure that the functional layer remains encapsulated in the object. Experiments have shown that the radial position of the belly of the functional layer in the dose was a function of the compression rate, of the geometry of the object and of the rheology of the resins.

Figure 10:
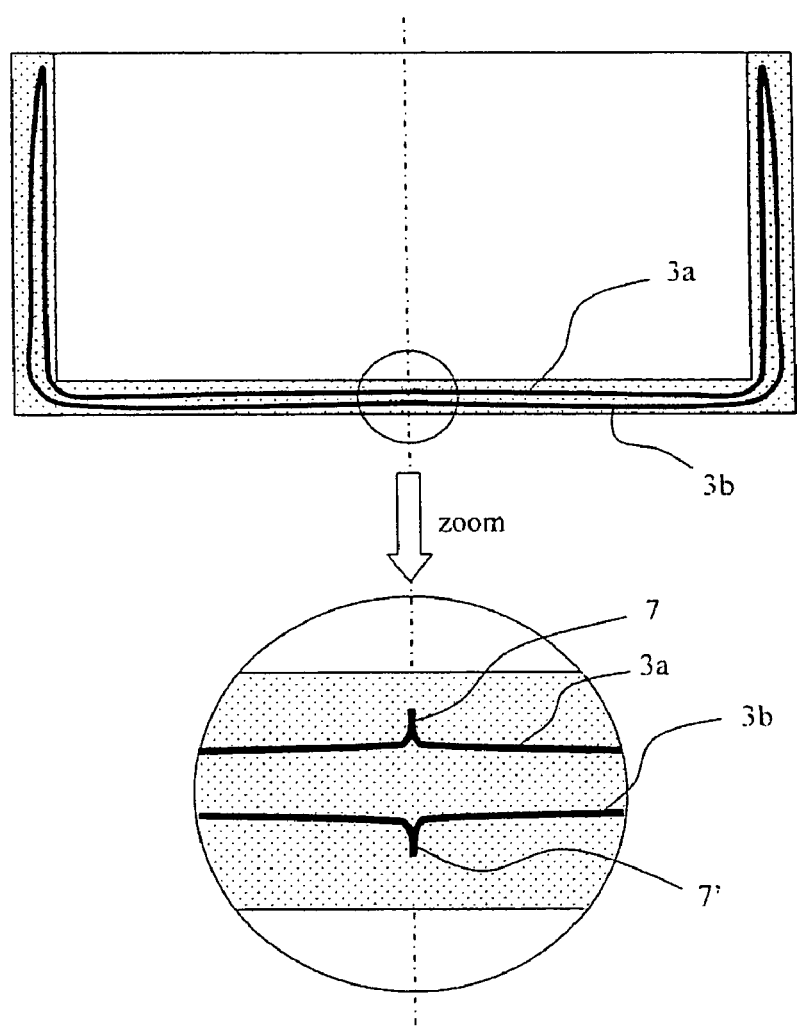

An example of a multilayer object obtained from the compression of this dose is illustrated in FIG. 10. This object has the peculiarity of having a double layer of functional resin covering the whole of the surface of the object. This object is obtained by compressing the multilayer dose in a simple compression device, which requires no modification relative to the compression device which would be used to realize the same object from a single-layer dose. A detailed observation of the multilayer object at the level of the axis of symmetry, such as illustrated in FIG. 10, shows the ends 7 and 7' of the functional layer forming a sort of peak perpendicular to the surface of the layer.

Figure 11:
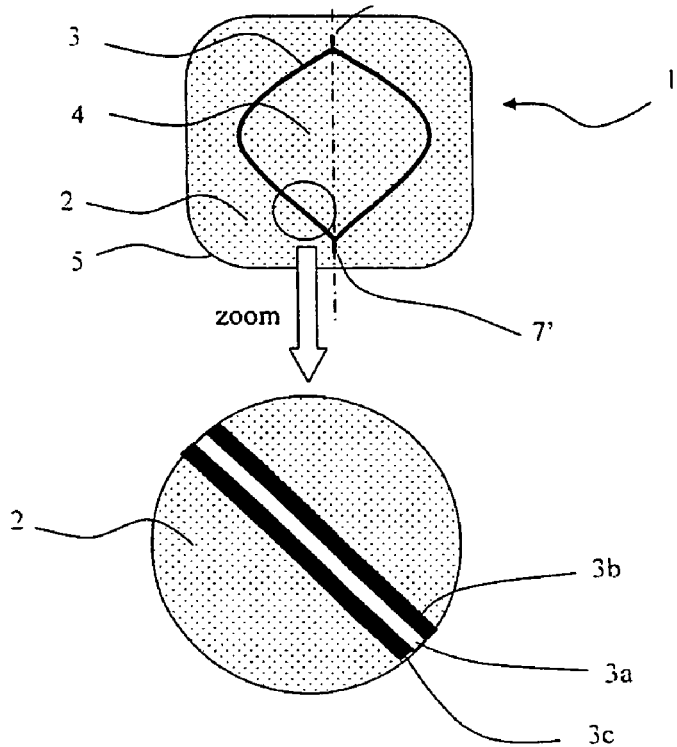

FIG. 11 shows that the invention is not limited to a triple-layer dose as illustrated in FIG. 9. A dose comprising 5 layers, such as illustrated in FIG. 11, is particularly advantageous, since the insertion of an adhesive layer 3b and 3c on either side of the barrier layer 3a allows resins of different nature to be combined, while ensuring good adhesion between the different layers, which prevents possible problems of delamination or decohesion in the multilayer objects. The adhesive and barrier layers lie parallel and are small in quantity. The aggregate of the adhesive layers 3b and 3c and of the barrier layer 3a forming the functional layer 3 generally represents a quantity of resin less than 15% of the total resin volume forming the dose, and preferably a quantity interior to 10%.

Figure 12A:
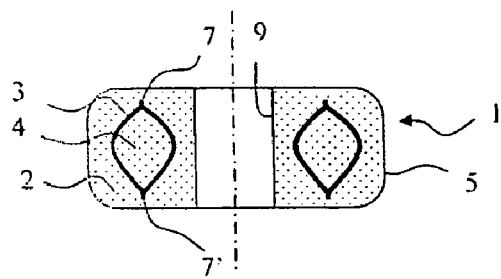
FIGS. 12a and 12b illustrate annular doses belonging to the invention.
Figure 12B:
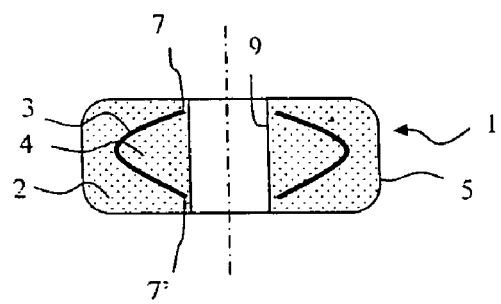

FIGS. 12a and 12b show that the invention is not limited to cylindrical doses as illustrated in FIG. 9, these doses can be annular for the realization of multilayer objects containing an orifice. The annular multilayer doses such as represented in FIG. 12a and 12b are particularly advantageous for realizing multilayer objects containing an orifice, such as, for example, tube heads. The dose presented in FIG. 12a is used when the compression of the dose produces a joint flow toward the periphery and toward the center, whereas the dose 12b is used when the compression of the dose only gives rise to a flow toward the periphery.

Figure 13:
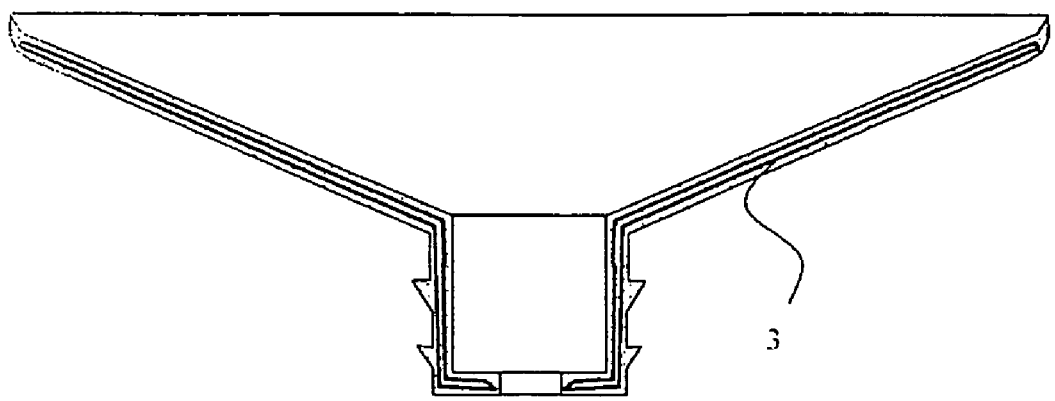

FIG. 13 shows a tube head realized by compression molding of a multilayer dose such as represented in FIG. 12a. In the thickness of the object can be found a double functional layer covering the whole of the surface area of the object. The functional layer spreads out to the periphery of the object and as far as the orifice, while remaining totally encapsulated. In order to control the spread of the layer in both directions, it is necessary to adjust the geometry and the position of the functional layer inside the dose.

Figure 14:
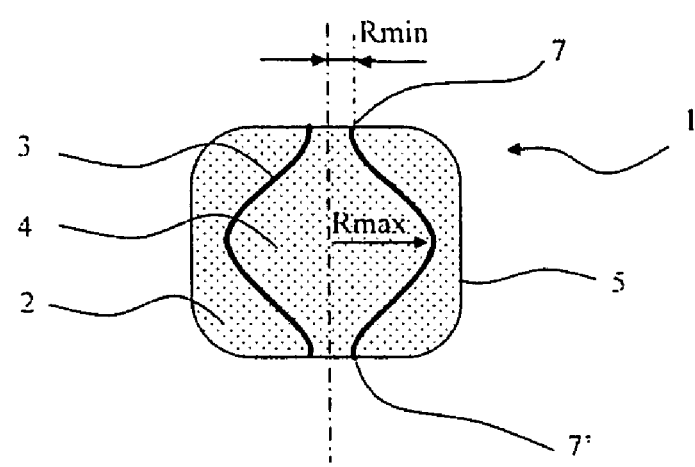

Doses similar to the doses presented in FIGS. 9 and 12 can be realized. FIG. 14 shows a multilayer dose containing a resin layer 4 imprisoned laterally by a fine layer of functional resin 3, itself imprisoned by a resin layer 2 forming the outer surface 5 of the dose. The functional resin layer 3 defines an axisymmetrical geometry in the form of a pear which is open at both ends, the radius Rmin defining the opening at the ends being less than or equal to 80% of the maximum radius Rmax defining the belly of the functional layer, and Rmin preferably being less than 10% of the radius Rmax. The dose presented in FIG. 14 differs singularly from the dose proposed in patent JP 2098415 (FIG. 3), which is characterized in that the functional resin layer forms a cylindrical geometry. The extrusion of doses such as described in patent JP 2098415 can produce a geometry of the functional resin layer which is not perfectly cylindrical as in FIG. 3, but which is slightly deformed. This slight deformation of the functional layer can be is caused naturally, by a joint effect of the relaxation of stresses upon exit from the extruder (swelling phenomenon) and of gravitational force, which causes the dose to sag under its own weight. These deformations of the dose can produce a geometry of the functional layer which is characterized by a minimum radius Rmin greater than 80% of the maximum radius Rmax. As has previously been demonstrated, this type of dose does not produce multilayer objects having good impermeability properties, owing to the surface area in the center of the object which is not covered by the functional layer. The invention allows an improvement in the impermeability of multilayer objects by significantly increasing the surface area of the object which is covered by the barrier layer. As will be set out further below, the realization of multilayer doses, such as presented in FIG. 14, calls for a specific device and cannot be realized according to the method presented in patent JP 2098415.

The method for realizing multilayer objects which is set out below is particularly advantageous for realizing objects such as plugs, lids, preforms, or, indeed, tube shoulders. This method can likewise advantageously be used to realize preforms in the form of a slab, these slabs then being used in thermoforming or blow thermoforming to form multilayer objects.

The doses presented in FIGS. 9, 11, 12 and 14 can be realized according to a number of methods. These different methods have a common element, which consists in coextruding the resins so as to form a multilayer structure, and at least the resin forming the central layer 4 of the multilayer structure being extruded with a variable flow rate.

Figure 15:
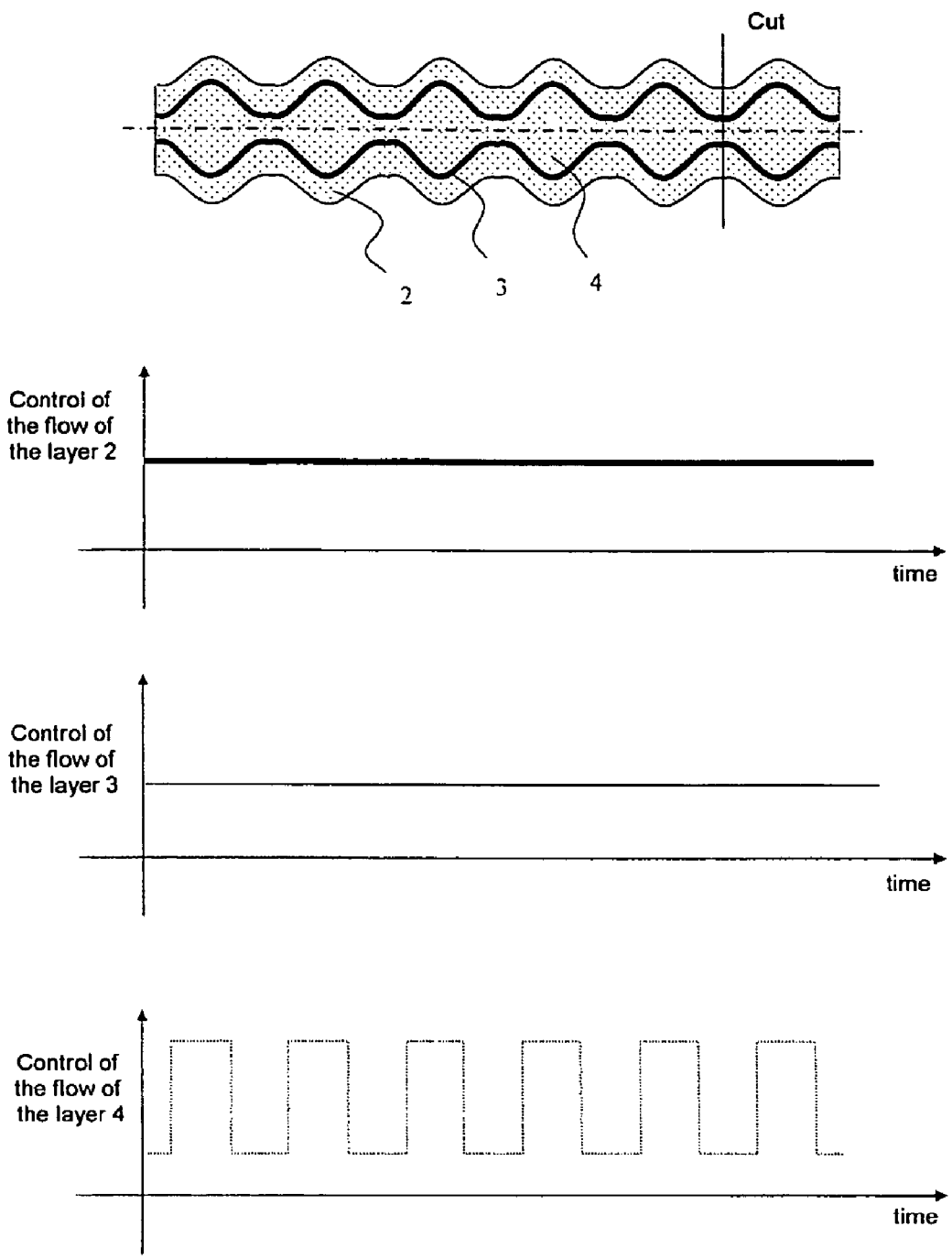

A first method for realizing doses is illustrated in FIG. 15. With this method, multilayer doses corresponding to the type of dose presented in FIG. 14 can be realized. This method consists in coextruding a multilayer rod continuously, such as presented in FIG. 15. The flow rate of the layer 2 forming the outer surface of the dose and the flow rate of the functional layer are constant. On the other hand, the flow rate of the layer 4 forming the inner layer of the dose fluctuates periodically between a maximum and a minimum value. The periodicity of the flow variations defines a wavelength corresponding to the length of the dose and likewise defines the frequency of cut of the multilayer rod. This method is particularly advantageous for realizing multilayer doses at very high speed. The realization method illustrated in FIG. 15 also allows doses to be realized which have the layer 4 totally encapsulated in the functional resin 3. For this, the resin layer 4 must have a flow rate which fluctuates periodically between a maximum flow rate and a zero flow rate.

Figure 16:
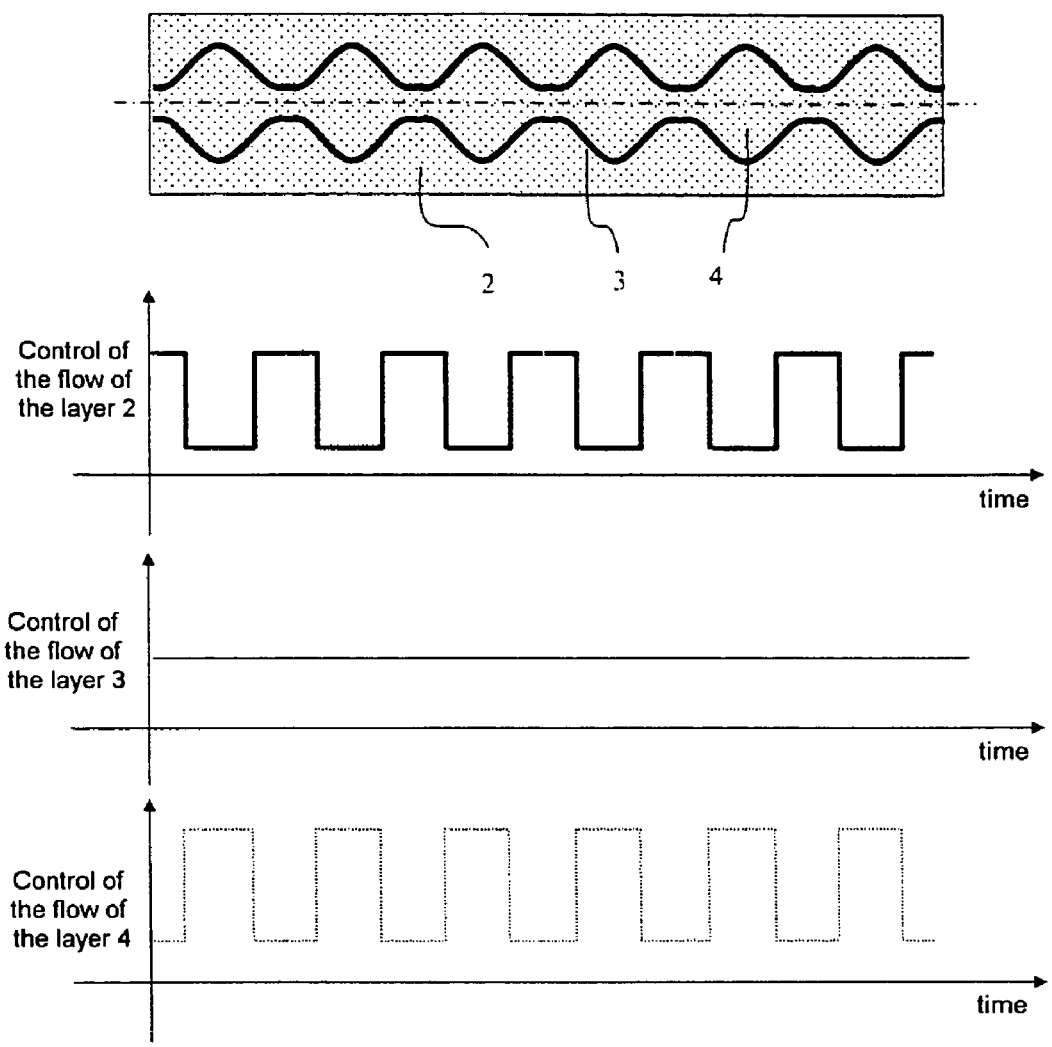

A second method for realizing doses is illustrated in FIG. 16. This method differs from the method illustrated in FIG. 15 by the fact that the flow rate of the resin layers 2 and 4 varies periodically and in phase opposition such that the overall flow rate remains constant or fluctuates weakly. The flow rate of the functional layer remains constant. The multilayer rod is cut upon exit from the coextrusion device at the frequency fixed by the periodical variations in the flow rate of the layers 2 and 4. This method can be advantageous for preventing faults linked to excessively abrupt variations in the overall flow rate (extrusion instabilities, orange peel). The flow variations of the layers 2 and 4 upon exit from the coextrusion device are generally gradual, even if the control signal is strobed, as indicated in FIG. 15. This phenomenon is linked to the inertia of the resin in the device. It is also possible to control the flow variations progressively by the use of appropriate devices.

Figure 17:
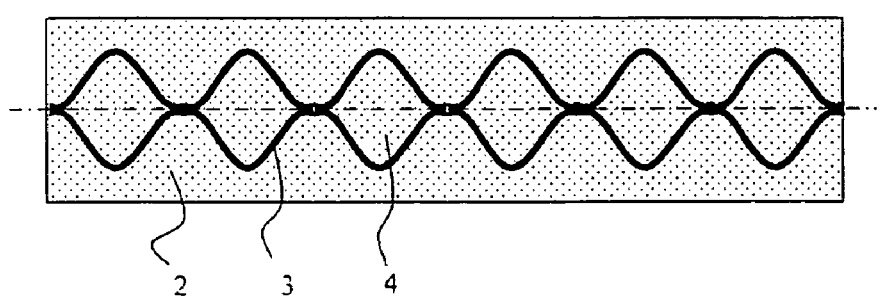

FIG. 17 illustrates a multilayer rod which can be obtained according to the method described in FIG. 16. The periodic cutting of the multilayer rod upon exit from the coextrusion device allows multilayer doses to be obtained. The multilayer rod is obtained by extruding the functional layer with a constant flow rate and by extruding the resin layers 2 and 4 with a flow rate which varies periodically and in phase opposition. The flow rate of the resin layer 4 fluctuates periodically between a maximum flow rate and a zero flow rate, leading to a total encapsulation of the resin layer 4 inside the functional resin layer.

Figure 18:
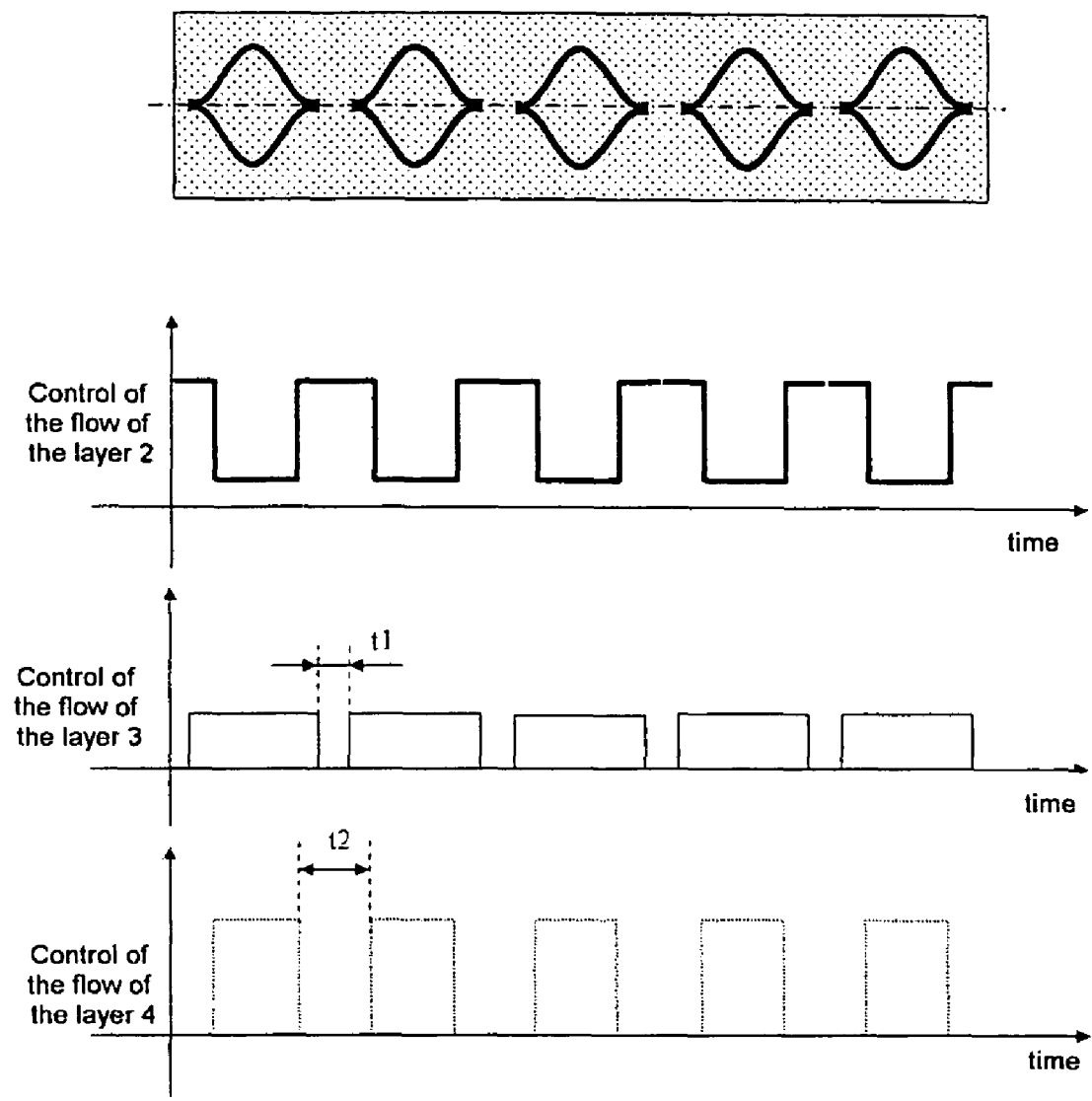

FIG. 18 illustrates the method for realizing multilayer doses identical to that presented in FIG. 9. This method consists in coextruding a multilayer rod comprising a resin layer 4, a functional layer 3 and a resin layer 2 forming the outer surface of the rod. The flow rate of the resin layers 2 and 4 varies periodically and in phase opposition. The flow rate of the resin 2 forming the outer layer of the rod fluctuates periodically between a minimum and a maximum value. The flow rate of the functional layer 3 varies periodically and has a zero value for a period t1. The flow rate of the layer 4 also varies periodically and has a zero value for a period t2. The flow variation of the layers is effected at a frequency corresponding to the production frequency of the doses. During the period t2 only the outer layer 2 is extruded, during the period (t2-t1) only the layers 2 and 3 are extruded.

Figure 19:
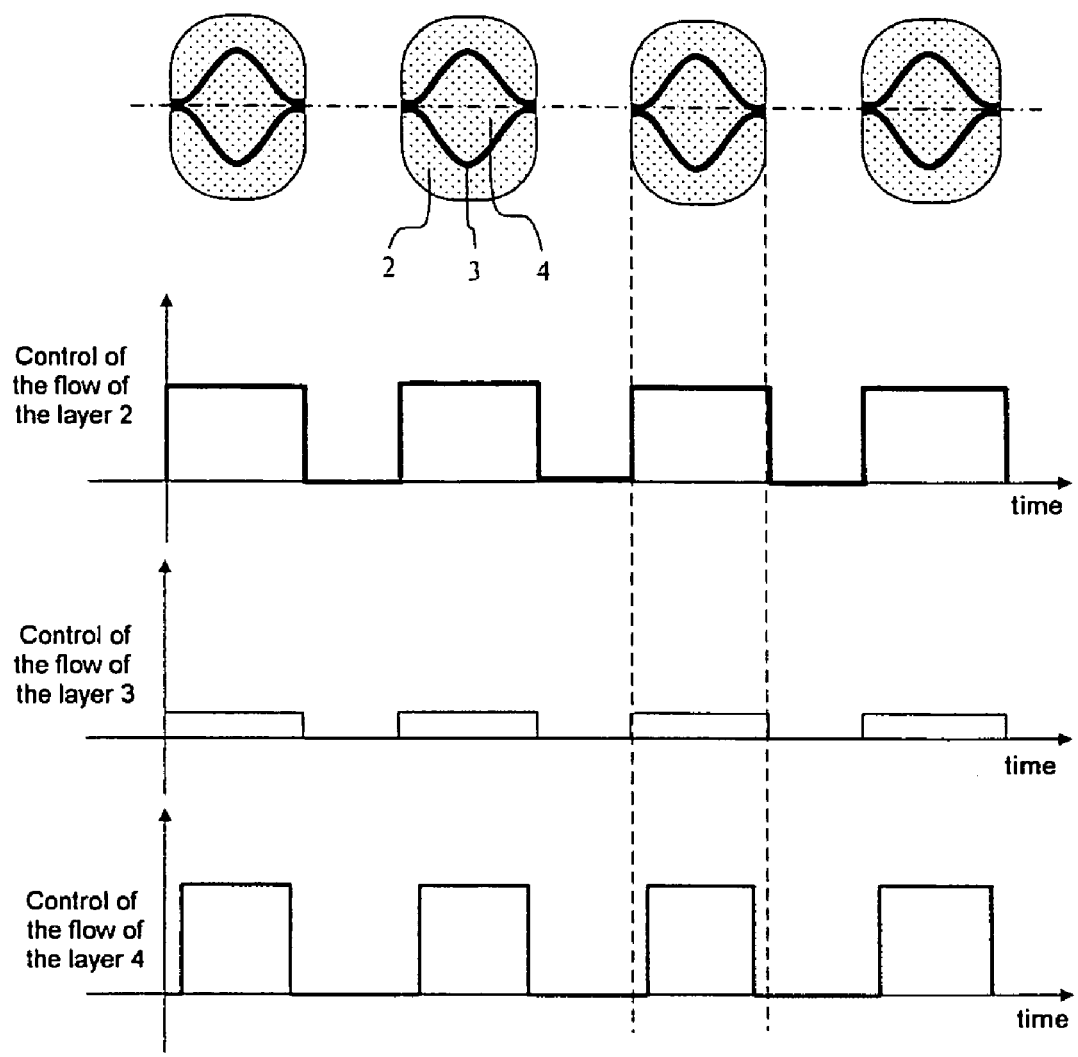

Another method for realizing multilayer doses such as illustrated in FIG. 14 consists in a discontinuous coextrusion process, characterized in that the overall flow rate of coextruded resin fluctuates between a maximum value and a zero value, the quantity of material dosed during a period corresponding to one dose. This realization method is illustrated in FIG. 19. During a period t1 the overall coextruded flow rate is zero, and during a period t2-t1 only the layers 2 and 3 are extruded, which allows the layer 4 to be encapsulated inside the functional resin layer 3. The method for realizing multilayer doses according to the method 19 has the advantage of allowing a volumetric metering of the multilayer dose, and hence a greater regularity of the doses.

The invention is not limited to a method for realizing 3-layer multilayer doses. For example, for the realization of 5-layer doses, as illustrated in FIG. 11, a control method similar to the method illustrated in FIG. 18 may be used.

Similarly, the invention is not limited to methods for realizing cylindrical doses, annular doses, for example, being able to be realized.

A number of devices may be used for realizing multilayer doses according to the methods illustrated in FIGS. 15 to 18, these methods consisting in coextruding a multilayer rod or tube and in varying the flow rate of one or more layers periodically, the multilayer rod or tube next being periodically cut so as to form the doses. The device comprises at least one coextrusion head connected to a plurality of extruders so as to feed the molten resins into the coextrusion head, and means for varying the flow rate of one or more layers periodically.

Figure 20:
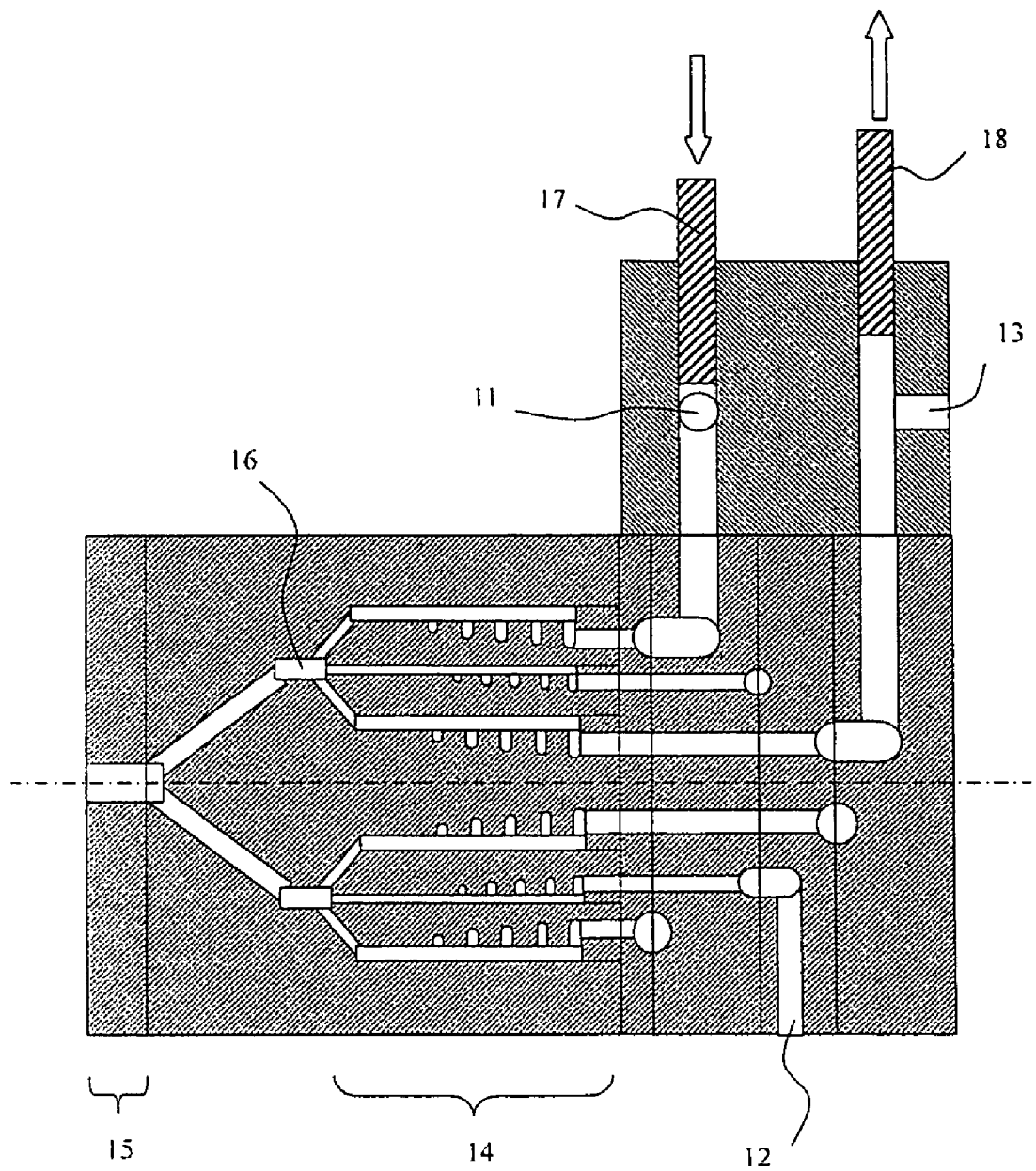

FIG. 20 illustrates an example of a device for realizing multilayer doses. This device comprises ducts 11, 12 and 13 for the respective feeding of the resins 2, 3 and 4, the resin 3 forming the functional layer and the resins 2 and 4 forming respectively the outer and inner layers of the dose. The ducts 11, 12 and 13 are connected to the extruders by appropriate known means. The device also comprises a distributor 14, by which each layer can be suitably distributed over the circumference. Several type of distributors can be used, such as, for example, helical distributors or distributors with cardioid geometry or portmanteau distributors. The device comprises a connector 15, which allows the geometry of the rod or of the extruded tube to be modified by changing the geometry of the connector. The device will preferably have a common junction 16 of the resin layers 2, 3 and 4. This common junction 16 allows easy variation of the position of the functional layer 3 by varying the respective flow rates of the layers 2 and 4. The device is characterized by means 17 and 18, by which the flow rate of the resin layers 2 and 4 can be varied periodically. The alternating motion of the rams 17 and 18 allows rapid and periodic variation of the flow rate of the layers 2 and 4. A falling motion of the ram creates a rise in pressure and, consequently, an increase in the flow rate of the layer. Conversely, a rise of the ram creates a fall in pressure and reduces the flow rate of the layer. For greater effectiveness, the ram can be linked with one or two shut-off valves, the first being situated upstream and the second downstream of the ram. The ram can be actuated mechanically or by means of a cylinder. The invention is not limited to the device previously described. Rams and shut-off valves may equally be linked with the functional layer 3. A similar device to that described in FIG. 20 may be used to realize a 5-layer dose.

Figure 21:
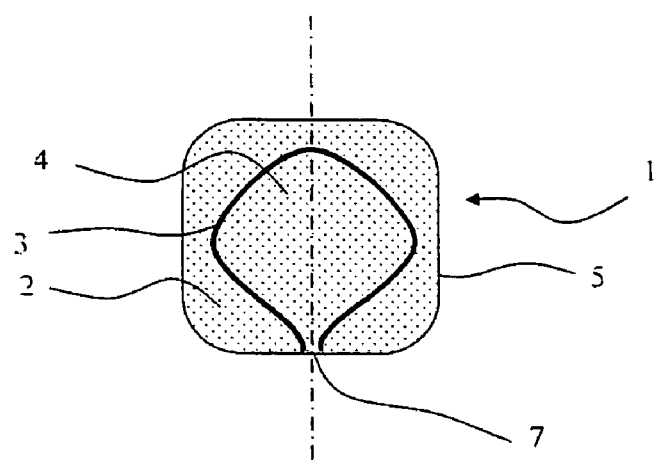

FIG. 21 illustrates another particularly advantageous multilayer dose for realizing multilayer objects by compression molding. This dose comprises a first resin layer 4 forming the inner part of the dose, a fine layer of functional resin encapsulating the resin layer 4, and a resin layer 2 forming the outer layer of the dose and encapsulating the functional resin layer 3. The functional layer 3 defines a three-dimensional, axi-symmetrical geometry in the shape of a pear and has an end 7 situated close to the axis of symmetry, forming a small, slightly conical opening. The layer 3 intersects the axis of symmetry at a point situated opposite said end 7.

Figure 22:
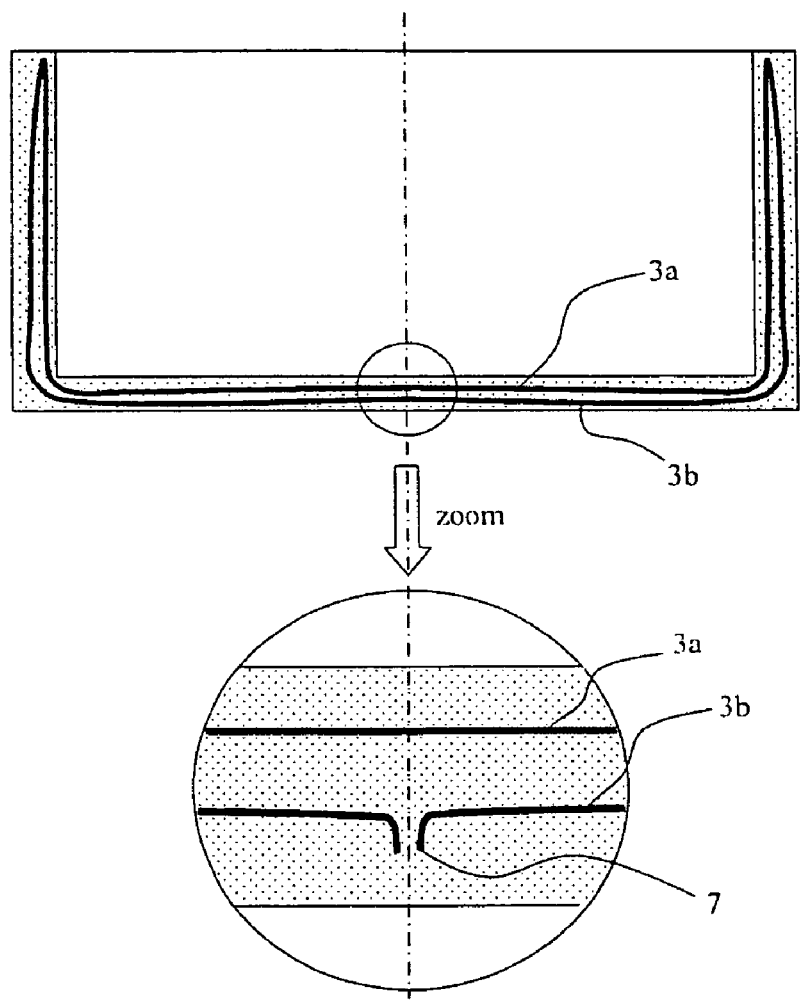

These multilayer doses are particularly advantageous for forming multilayer objects by compression molding of said dose in a mold. FIG. 22 shows a multilayer object realized from the dose represented in FIG. 21. This object contains a double functional layer 3a and 3b imprisoned in the wall of the object, said functional layer having a discontinuity at the level of the axis of symmetry of the object. This discontinuity takes the form of a hole of small diameter in the functional layer 3b of the object. This hole corresponds to the end 7 of the functional layer 3. The diameter of said hole in the functional layer 3b is less than 10 mm in value and is generally less than 3 mm. The multilayer object 22 obtained from the dose represented in FIG. 21 has a first layer 3a totally absent from the surface of the object, as well as a second layer 3b having an opening and possibly present on the surface of the object.

For hygiene reasons and reasons pertaining to the performance of the multilayer object 22, it is preferable for the layer 3b not to be situated on that side of the surface of the object which is in contact with the packaged product.

The invention is not limited to a dose having 3 layers, as in FIG. 21. It may be advantageous to have a greater number of layer, especially so as to improve the adhesion between the layers. In this sense, the functional layer 3 presented in FIG. 21 can be regarded as an aggregate of a plurality of fine parallel layers. For example, the functional layer can itself contain 3 layers, of which a layer of barrier resin sandwiched between two layers of adhesive resin.

Figures 23A, 23B, 23C, 23D:
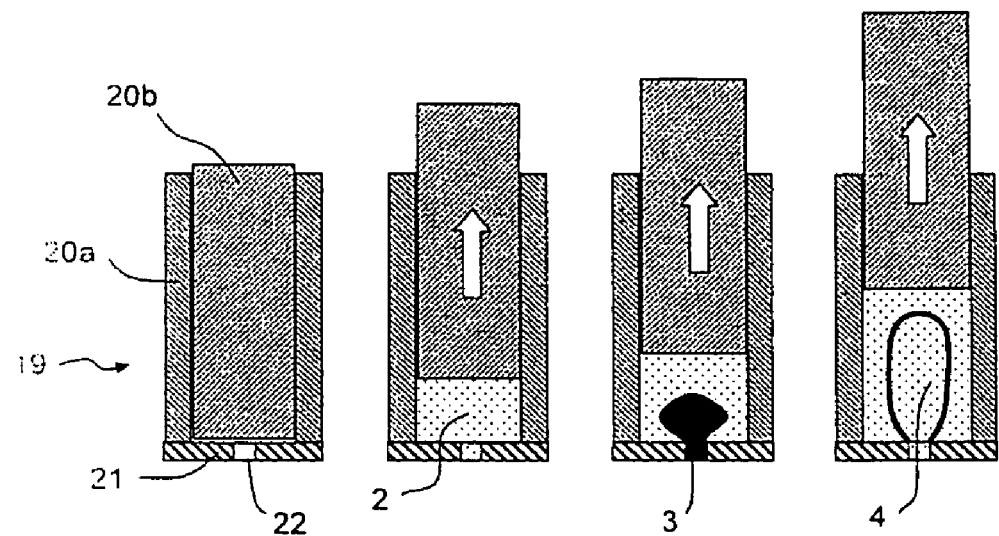
FIGS. 23a to 23d illustrate the method for realizing the dose described in FIG. 21.

The method for realizing multilayer doses represented in FIG. 21 is illustrated in FIG. 23a to 23d. This method consists in molding the multilayer doses and is characterized in that the resins are fed sequentially into a variable cavity of a transfer mold 19, the volume of the cavity varying with the quantity of resin fed into said cavity. These doses have then transferred in the molten state into the compression mold so as to realize the multilayer object. FIG. 23a shows the transfer mold 19 prior to being filled with resins. The casing 20a, the ram 20b and the cover 21 make up the transfer mold 19 and define a cavity having an opening created by the orifice 22. Before the resins are fed in, the volume of the cavity is reduced. The method consists in feeding in, first of all, the resin 2 forming the outer layer of the dose. FIG. 23b shows the resin 2 fed through the orifice 22, causing the displacement of the ram 20 and conjointly inducing an increase in the volume of the cavity of the transfer mold 19 proportional to the volume of resin fed in. The method consists in next feeding the functional resin 3 into the transfer mold 19. FIG. 3c shows the feeding of the resin 3 and its spread inside the resin 2 already in the mold. The method consists finally in feeding in the resin 4 forming the inner layer of the dose. FIG. 3d illustrates the feeding of the resin 4 and its spread inside the functional layer 3 conjointly with the displacement of the ram 20.

Figures 24A, 24B, 24C:
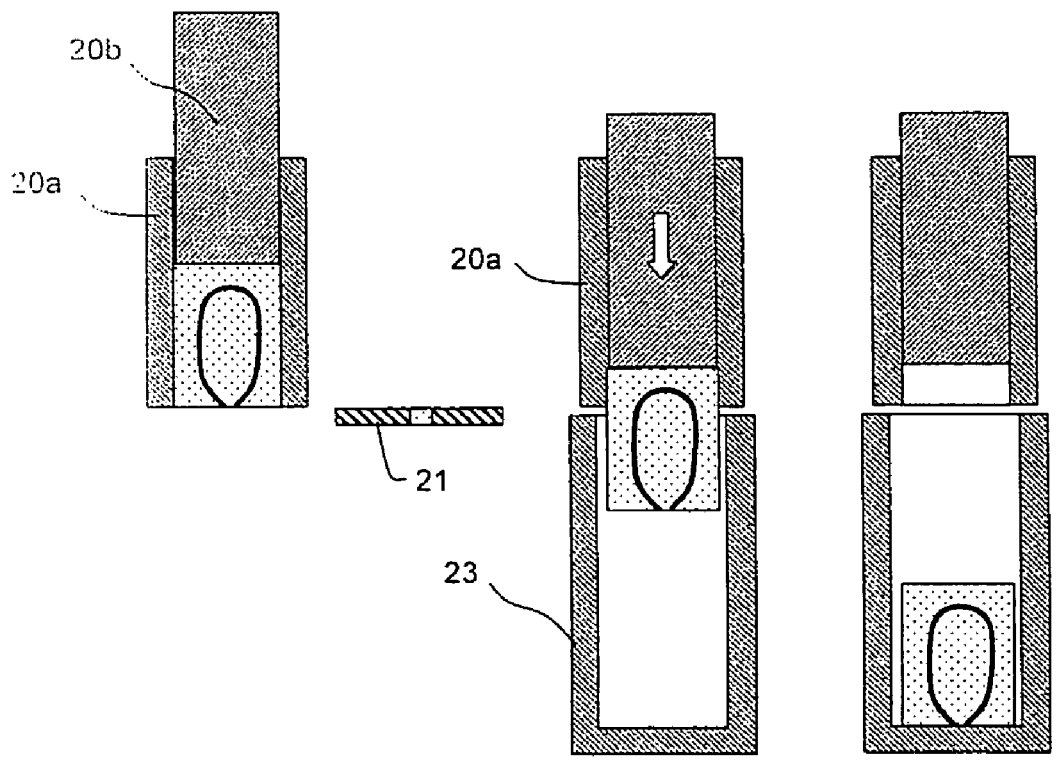
FIGS. 24a to 24c show a method for transferring the dose into the compression mold.

The multilayer dose in the molten state is next transferred from the transfer mold to the compression mold. The transfer method is briefly illustrated from FIGS. 24a to 24c. The first step of this method, illustrated in FIG. 24a, consists in separating or opening the cover 21 in surface contact with the bottom surface of the multilayer dose. The dose is then expelled from the transfer mold 19 by means of the ram 20b, such as illustrated in FIG. 24b. FIG. 24c shows the multilayer dose deposited in the cavity of the compression mold 23.

The multilayer dose must be in the molten state during its transfer into the compression mold 23 so as to allow the compression molding and prevent blemishes. For this, the control of the temperature of the transfer mold 19 and of the dwell time of the dose in the transfer mold is very important. The temperature of the parts which make up the transfer mold 19 must be adjusted so as to allow, conjointly, the demolding of the dose and the formation of a skin on the surface of the dose which is sufficiently fine for it to remelt prior to the compression. The temperature of the transfer mold must be as high as possible so as to approach the temperature the molten resin and the dwell time in the transfer mold must be as short as possible.

The ejection of the multilayer dose into the compression mold can be effected by a method other than that illustrated in FIG. 24. For example, a side opening in the casing 20a perpendicular to the axis of symmetry allows easier extraction of the dose.

FIGS. 25a to 25c illustrate the compression of the multilayer dose. FIG. 25a shows the positioning of the dose in the cavity of the mold 23. FIG. 25b shows the fall of the plunger 24 which compresses the dose and forms the multilayer object. FIG. 25c illustrates the multilayer object which is obtained.

A device for realizing multilayer objects from a molded dose is presented diagrammatically in FIG. 26. This device is constituted by a first carousel 25 comprising molds, means for compressing the doses and means for ejecting the molded objects. This device is also constituted by a second carousel comprising transfer molds 19, means for feeding the resins sequentially into the transfer molds, means for increasing the volume of the cavity of the transfer molds as the resins are fed into said molds, and also means for transferring the doses into the compression molds. The transfer of the doses is effected at the meeting point 27 of the trajectory of the transfer molds and of the compression molds. The device additionally comprises means for setting the carousels into rotation and means for adjusting and controlling the parameters.

Figure 27:
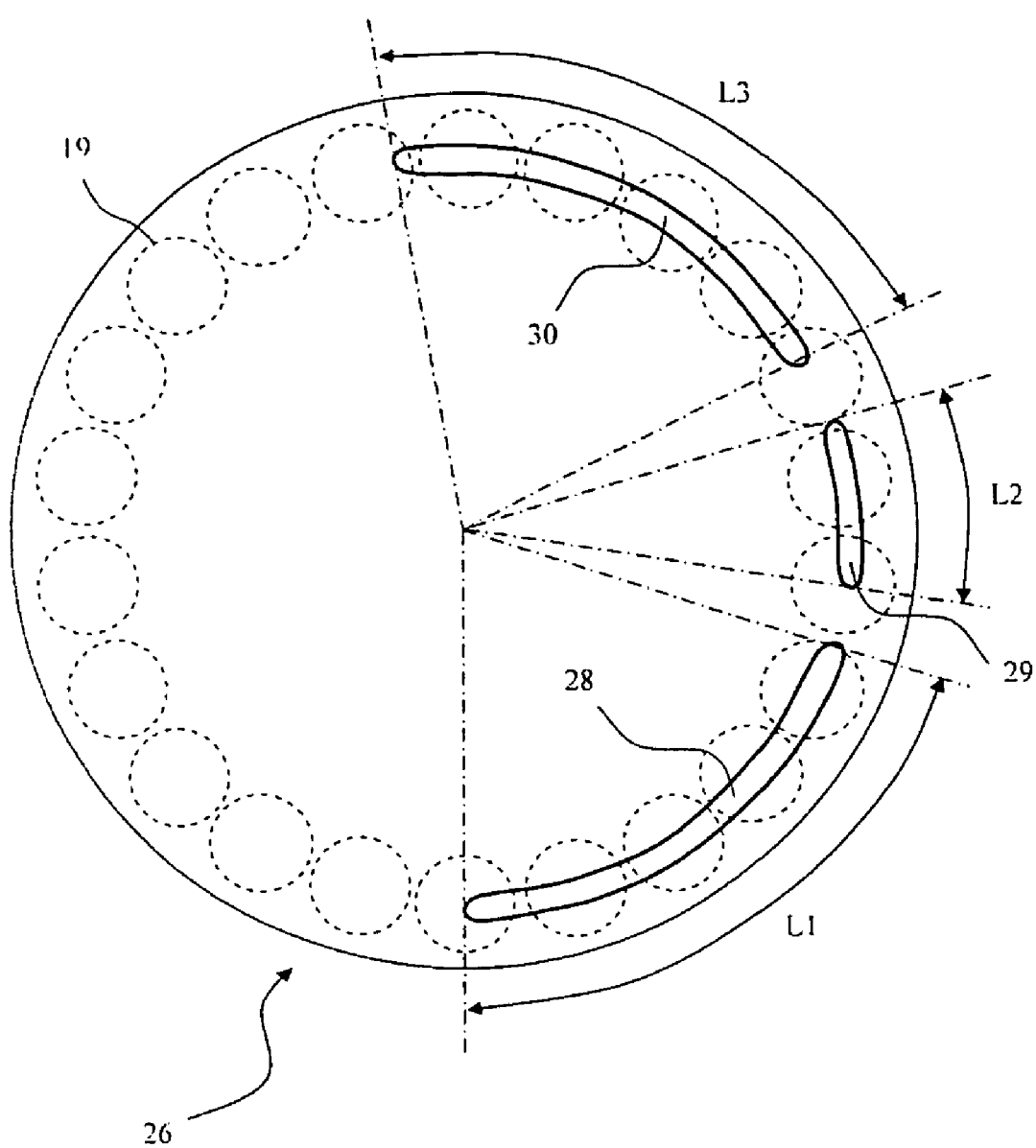

The description of the transfer carousel 26 is illustrated in FIG. 27. This rotating carousel carries transfer molds 19. During the rotation of the carousel 26, the molds 19 pass sequentially above a first feed channel 28, a second feed channel 29 and a third feed channel 30. Said feed channels 28, 29 and 30 are fixed and are connected to extruders. When the transfer mold 19 passes in line with a channel, the resin which is fed under pressure into the channel fills the cavity of said mold. FIG. 27 indicates that a mold passing sequentially above the channels 28, 29 and 30 fills sequentially with resins fed into the respective channels. Thus, by feeding the resins 2, 3 and 4 respectively into the channels 28, 29 and 30, a dose is obtained identical to that presented in FIG. 21. The respective quantities of resins fed into the cavity of the transfer mold 19 can be adjusted with the respective lengths L1, L2 and L3 of the channels 28, 29 and 30, as well as with the feed pressure of each resin.

The objects realized according to the invention have particularly advantageous barrier properties. This can be explained, in part, by recognizing that the majority of objects realized according to the invention have a functional layer sufficiently covering the surface area of the object and, in particular, the surface area close to the axis of symmetry of the object.

The resins used within the scope of the invention correspond to the thermoplastic resins currently being used, and more particularly to those used in the packaging industry. Amongst the barrier resins which may be used to form the functional layer 3 can be cited ethylene vinyl alcohol copolymers (EVOH), polyamides such as Nylon-MXD6, acrylonitrile-methylacrylate copolymers (BAREX), fluorinated polymers such as PVDF. In this connection can also be cited a few resins which may be used for the layers 2 and 4 of the dose: polyethylene (PE), polypropylene (PP), polystyrene (PS), polyamide (PA), polyester (PET). This list is not exhaustive. In the choice of resins, it is important to select products which have neighboring viscosities. In general, it is preferable to use resins which, at working temperature, have a viscosity ratio less than 10, and preferably a viscosity ratio less than 3 will be chosen.

The invention equally relates to multilayer doses comprising a plurality of functional layers, said functional layers being individually imprisoned in a resin forming at least 80% of the volume of said dose. According to the invention, at least one functional layer has a variable distance to the axis of symmetry. The use of a dose comprising a plurality of functional layers can be advantageous at a very high production speed. Indeed, at very high speeds, it is difficult to obtain strong variations in flow rate. The second functional layer can be of tubular geometry centered on the axis of symmetry of the dose, the radial position of this layer in the dose being such that the compression of the layer produces a multilayer object having two independent functional layers which are placed partially one on top of the other and produce properties similar to those of a continuous layer. The second functional layer can likewise have a variable distance to the axis of symmetry. A particularly interesting dose has its two functional layers in parallel.

The invention is of particular interest for the realization of multilayer objects such as preforms or plugs.

In the examples which are presented here, the doses and the objects are of simple geometry, but the invention obviously relates to any geometry of dose and of object.

The objects obtained according to the invention contain a functional layer 3 forming at least one fold at the level of the periphery of the object. Objects also containing a second fold close to the axis of symmetry of the object can be obtained. A zigzag arrangement of the functional layer is obtainable in the object.

The invention has been described with a single functional layer 3 distributed in the dose. Doses comprising a plurality of functional layers 3 may equally be used, said functional layers all being centered on the axis of symmetry of said dose. The multilayer objects obtained are characterized in that the functional layers are placed at least partially one on top of the other and are distributed throughout the object.

Other dose geometries may be used. It has been observed that doses which have a part of their surface concave are particularly advantageous. Such dose geometries facilitate good distribution of the functional layer in the multilayer object.

The realization of packagings or packaging components for food applications calls for good hygiene properties. It is thus often desirable for the functional layer 3 not to be in direct contact with the packaged product. It may be advantageous to imprison the functional layer 3 totally in the dose, such that said functional layer is totally imprisoned in the object.

Alternatively, it is possible for just one end of the barrier layer not to be imprisoned.

The invention claimed is:

1. A dose comprising:
   a molten multilayer dose for compression molding, having an axis of symmetry for the realization of multilayer objects by compression molding, comprising
      a first synthetic resin and
      a functional layer imprisoned in said first resin, said functional layer
      representing less than 20% of the volume of the multilayer dose,
   wherein the functional layer forms the shell of a body of revolution about the axis of symmetry and the distance from the functional layer to the axis of symmetry is variable as measured before compression molding.

2. The dose as claimed in claim 1, wherein the ratio ($R_{min}$-$R_0$)/($R_{max}$-$R_0$) is less than 0.8, $R_{max}$ and $R_{min}$ being respectively the maximum and minimum distances from the functional layer to the axis of symmetry and $R_0$ being the radius of an orifice centered about the axis of symmetry, the value of $R_0$ conforming to the following relationship: $0 < R_0 < R_{min}$.

3. The dose as claimed in claim 1, wherein the functional layer itself forms a multilayer structure comprising a layer of barrier resin imprisoned between two layers of adhesive resin.

4. The dose as claimed in claim 1, comprising a plurality of functional layers.

5. A multilayer object obtained by compression molding of a molten multilayer dose having an axis of symmetry, said dose being constituted by a first synthetic resin and by a functional layer imprisoned in the first resin, the functional layer representing less than 20% of the volume of the dose, the functional layer forming the shell of a body of revolution about the axis of symmetry of the dose and the distance from the functional layer to the axis of symmetry being variable as measured before compression molding.

6. A process for the production of an axisymmetrical multilayer dose as claimed in claim 1, comprising a step in which the distance from the functional layer to the axis of symmetry of the dose is varied, said process consisting in coextruding a multilayer rod or tube of resins in the molten state, then in periodically cutting said rod or said tube in the molten state, the flow rate of at least one layer varying periodically, the periodicity of the flow rate being equal to the periodicity of the cutting.

7. The process as claimed in claim 6, wherein the flow rate of two layers varies periodically and in phase opposition.

8. A process for the production of an axisymmetrical multilayer dose as claimed in claim 1, comprising a step in which the distance from the functional layer to the axis of symmetry of the dose is varied, said process consisting in injecting, into the cavity of a mold, a plurality of resins in the molten state, at least one of which is a functional resin, the injection of the functional layer being preceded and followed by the injection of at least one resin, then in ejecting the dose in the molten state from the cavity of said mold, and in varying the volume of the cavity proportionally to the volume of resin injected, thereby producing the molten multilayer dose as claimed in claim 1.

* * * * *